United States Patent Office 3,006,536
Patented Oct. 31, 1961

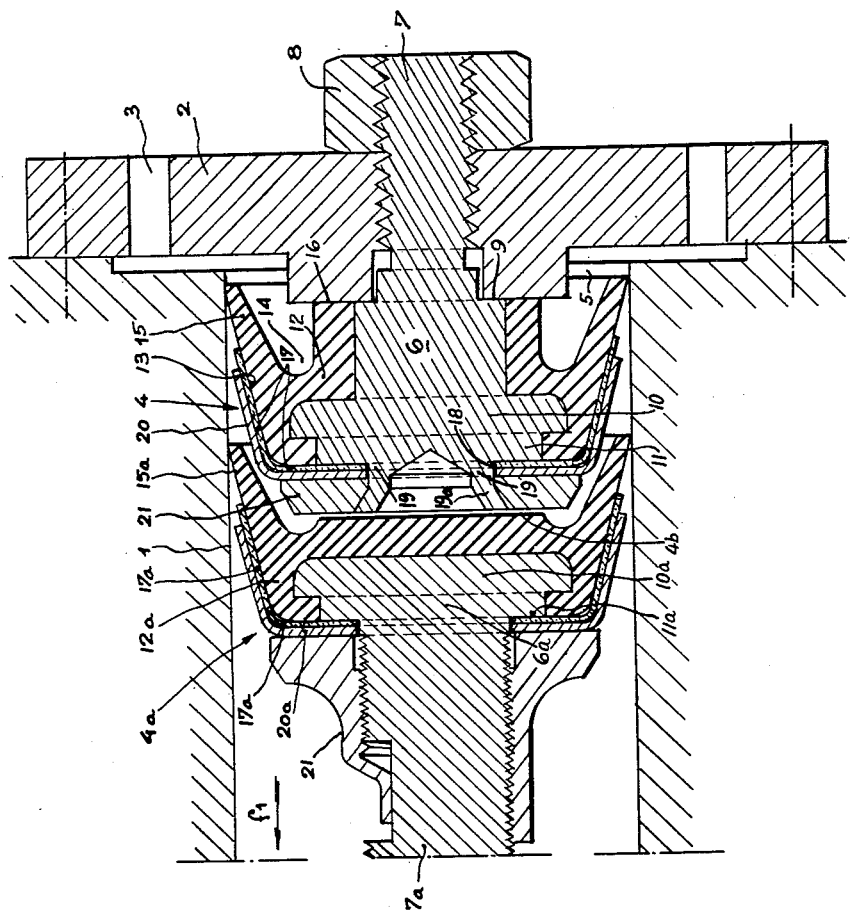

3,006,536
PISTONS OR FLAP-VALVES FOR COMPRESSORS AND PUMPS
André Chausson, Asnieres, France, assignor to Societe Anonyme des Usines Chausson, Asnieres, France, a French company
Filed July 28, 1959, Ser. No. 830,089
2 Claims. (Cl. 230—172)

In certain applications, and more particularly in pumps and compressors, such as those used in refrigerators for compressing and forcing freezing fluids, it is often advantageous to use pistons and flap-valves provided with a packing or sleeve of flexible material for valvelike seals with the wall of a cylinder, so as to enable the passage of the fluid for compressing and for its intake.

Pistons and flap-valves of this kind are used more particularly in electromagnetically operated compressors where their use has been considered to be particularly advantageous owing to the ease that they generally afford with regard to their construction.

In these devices, the packing or sleeve of flexible material usually is fixed on a metal support by means of a securing member, such as a screw or nut, for example. However, it frequently happens with such arrangements that the flexible packing is slightly deformed at the time of fitting and consequently does not function properly and rapidly becomes defective.

The present invention completely obviates the abovementioned disadvantages by creating a new device which is characterised in that a cap of material having great flexibility, rubber, for example, is secured to a rigid support, at least partly wrapped in this cap whose deformations are limited at least in one direction by a cuplike cover partly surrounding the periphery of the cap, this cover being made of a material with a limited resiliency so that it partly absorbs the mechanical stresses applied to the cap without running the risk of damaging it.

According to one form of embodiment of the invention, the piston and/or flap-valve comprises a metal core integral with a fixing rod, this core forming at least part of the fixing for a flexible packing which wraps round it and to which it adheres, then at least a part for the fixing of a cap for retaining the flexible packing which is made of a material having given mechanical characteristics, to prevent any exaggerated deformation of said flexible packing, while at the same time not risking damage to this flexible packing during the deformations to which it is subjected during working operations.

Various other characteristics of the invention will moreover be revealed by the detailed description which follows.

One form of embodiment of the purpose of the invention is shown, by way of non-restrictive example, in the attached drawing.

The single figure is an elevation-section showing a form of embodiment of the invention.

In the form of embodiment according to the drawing, the invention is put into operation for producing a piston and flap-valve assembly of a compressor or pump.

Referring specifically to the drawings, a cylinder 1 is fixed, by suitable means, not shown, to a cylinder-head 2 having openings or slots 3 in communication with the cylinder. The end of the cylinder 1 is closed by a flap-valve 4 which forms, with the cylinder-head 2 a compression chamber 5. The flap-valve 4 comprises a core 6, cylindrical, for example, which is integral with a stem 7 threaded into the cylinder-head 2 and secured by a lock-nut 8.

The core 6 has a larger section than the stem 7, so as to form a shoulder 9 bearing against the cylinder-head 2. In addition to the stem 7, the core 6 has a flange 10 and a head 11 of smaller diameter than the flange 10. The core 6, flange 10 and head 11 assembly is completely embedded in a flexible packing 12, advantageously made of synthetic rubber.

The packing 12 is shaped at its periphery so as to form a frustrum of a cone 13 and has an annular cavity 14 forming a thin annular lip 15 and a sleeve portion having a flat end 16 coplanar with the shoulder 9 of the core 6. The packing 12 is secured to the core 6, the core 6, flange 10, and head 11 in known manner. A resilient cap 17, preferably made of resin or other synthetic material, is so shaped as to completely surround the base of the flexible packing 12 but is of a lesser diameter so that it cannot contact the wall of the cylinder 1.

As shown by the drawing, the cap 17 has a central opening 18 and is fitted on to a projection 19 of the head 11. The cap 17 is retained in position by a cup 20 which partially fits into it and which is pressed against it by a washerlike retainer 21 also fitted on the projection 19 which is hollowed out internally and has its end portion 19a expanded for securing the retainer 21 to clamp the cup 20 and cap 17 against the head 11 and packing 12.

The foregoing structure enables the flexible packing 12 to be made in an extremely accurate manner with a very thin—and hence, very flexible—lip 15 which is maintained and reinforced by the cap 17 whose resiliency is sufficient to prevent any damage to the lip 15. Moreover, the cap 17, whose characteristics of mechanical strength are necessarily low, is itself maintained by the cup 20, made of metal, for example, so that said cap 17 does not run the risk of undergoing deformations that might shorten its life.

Furthermore, the method of fitting the cap 17 and cup 20 is such that these members do not normally exert any pressure on the flexible packing 12, which, hence, is not deformed at the time of fitting. Consequently, this packing 12 can be made in an extremely accurate manner, and also, it retains its accuracy even after fitting, because none of the parts supporting it exert any mechanical constraints on it, although this flexible packing is in fixed relation to the cylinder-head 2 which supports it by means of the stem 7.

For producing compression of a gas or pumping a liquid into the cylinder 1, a piston 4a is disposed within the cylinder 1 and comprises a structure similar to that of the flap-valve described above. This piston comprises a core 6a similar to the core 6 of the flap-valve and this core also has a flange 10a. A flexible packing 12a of the same material as the packing 12 is secured on the core 6a and flange 10a and overlies the face of the flange with a cushionlike working face 4b. The core 6a is integral with a rod 7a similar to the stem 7 described above, this rod being intended to connect the piston 4a to a drive means (not shown).

The packing 12a of the piston has an annular lip 15a which is thin and presses against the wall of the cylinder 1. A cap 17a is fitted on to the rod 7a of the piston and this cap is retained by a cup 20a in the same manner as that described above in connection with the cap 17 and cup 20.

As shown by the drawing, in the case of the piston, the cap 17a presses against a shoulder 11a formed between the core 6a and the stem 7a so that the mechanical stress, which is exerted on the cap 17a by the cup 20a, itself retained by a nut 21 screwed on to the rod 7a, is not transmitted to the packing 12a so that the latter is not deformed. The structure of the piston is quite similar to that of the flap-valve, and consequently, the packing 12a which forms the active element of the piston, can be formed with very great accuracy, which is not impaired during fitting.

The operation of a compressor or pump as described above is obvious. Actually, when the piston is in movement in the direction of the arrow $f_1$, a reduction in pressure is created in the cylinder 1 between its working face and the flap-valve, which has the effect of strongly pressing the lip 15 of the flap-valve against the cylinder-wall, so that the main area of the cylinder is isolated from the compression chamber 5. When the depression is sufficient, the lip 15a of the piston is deformed inwardly so that this lip 15a defines with the cylinder wall, an annular space enabling the gas or liquid to enter the active part of the cylinder between the piston and flap-valve.

During the piston stroke opposite to that along the arrow $f_1$, opposite operations take place viz. the pressure tending to increase in the part of the cylinder between the piston and flap-valve, the lip 15a of the piston is pressed against the cylinder wall, whereas the lip 15 of the flap-valve is deformed to enable the fluid to pass towards the chamber 5. The flexibility of the lips 15 and 15a, both of the flap-valve and piston being very great, it follows that low pressures are sufficient to deform these lips in one direction or the other, thus affording a very long filling stroke as well as an equally long active discharge stroke.

Although the flexibility of the lips 15, 15a of the flap-valve and piston is great, the deformations that can be imparted to them are, in spite of everything, of slight amplitude, because these lips are maintained by the caps 17 and 17a respectively. This prevents the flexible packing from becoming damaged, even after a very long period of work.

In addition, at the end of the compression or discharge stroke the lip 15a of the piston partially surrounds the flap-valve, so that the harmful space is reduced to the minimum. Moreover, the working face 4b of the piston is so placed as to form a damping cushion in the case where the piston might abut the flap-valve, which can happen sometimes in variable stroke compressors and more particularly in compressors driven by an electromagnetic or electro-dynamic control. The working face 4b prevents the lip 15a, which is fragile, from damaging the flap-valve.

The invention is not restricted to the example of embodiment shown and described in detail, for various modifications can be made without departing from the concept thereof. In particular, the core, on which the flexible packing, both of the flap-valve and piston is fixed by treatment making this flexible packing adhere to the metal forming said core, can be given other shapes than those mentioned, by way of examples.

I claim:

1. A compressor comprising a cylinder, a valve in said cylinder for controlling discharge therefrom, and a piston in said cylinder for compressing fluids to be discharged by said valve, said piston including a threaded rod with an integral core of larger dimension to form a shoulder, said core having an integral flange of larger dimension, a flexible packing surrounding said core and said flange, said packing having a substantially flat portion overlying the face of said flange and an outer wall of frusto conical shape and forming a thin annular lip bearing against the wall of said cylinder, a cap fitted on said rod and bearing against said shoulder and partially overlapping said frusto conical wall, a substantially rigid cup fitted on said rod and partially overlapping said cap, and a nut threaded on said rod and retaining said cup and cap against said shoulder.

2. A compressor according to claim 1 wherein said valve comprises a support, a stem carried by said support axially of said cylinder and having an integral core of larger dimension and forming a shoulder abutment with said support, a radial flange integral with said core, a head of smaller diameter than said flange and a projection extending from said head toward said piston, a resilient packing surrounding said head, flange, and core and having an outwardly extending frusto conical wall with a thin lip bearing against the wall of said cylinder, a cap fitted on said projection and bearing against said head and partially surrounding said packing, a cup fitted on said projection and partially overlapping said cap, and a retainer rigidly connected to said projection and retaining said cup and cap against said head.

References Cited in the file of this patent

FOREIGN PATENTS 526,074    Belgium _____ Feb. 15, 1954